Patented Jan. 23, 1951

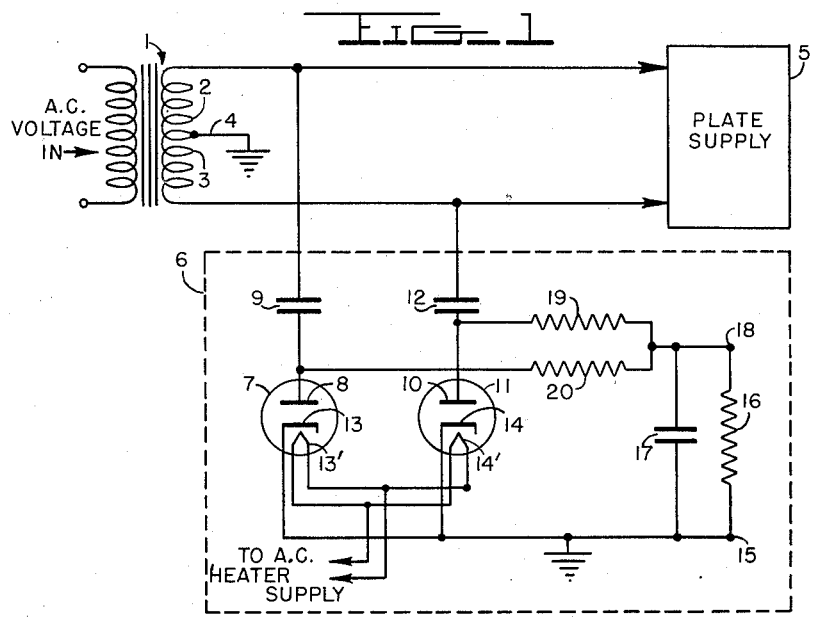
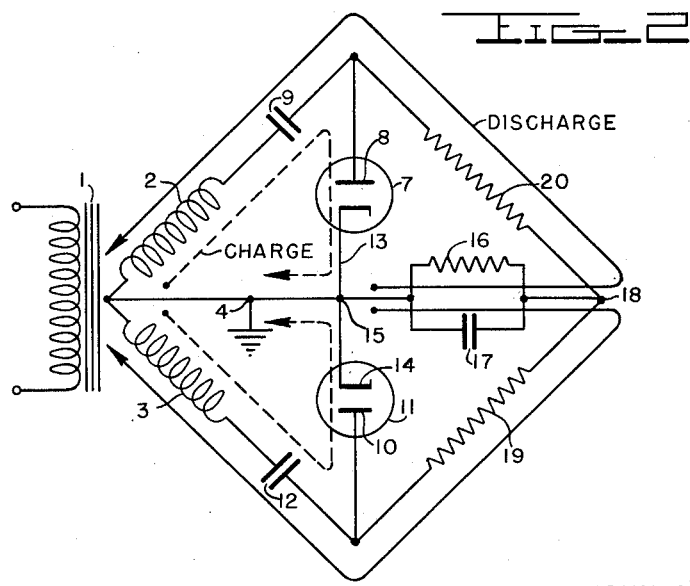
INVENTOR.
JOHN A. RADO
BY *M. A. Hayes*
*Attorney*

2,539,100

UNITED STATES PATENT OFFICE 2,539,100

BIAS SUPPLY

John A. Rado, Teaneck, N. J., assignor, by mesne assignments, to the United States of America as represented by the Secretary of the Navy Application June 11, 1946, Serial No. 675,859

7 Claims. (Cl. 321—32)

This invention relates generally to power supply circuits, and more particularly to full-wave rectifier circuits for generating, from an alternating current voltage, a direct current voltage suitable as a bias voltage for thermionic vacuum tubes.

Heretofore, bias voltages have been obtained from a transformer rectifier supply similar to the type used to develop direct-current plate voltage, thus necessitating the use of two transformers to obtain plate and bias supply voltages for a given electronic circuit. In these rectifiers the cathodes are usually maintained at a higher potential than the filaments, thereby causing possible cathode-filament breakdown. Generally, a bias supply furnishing the operating bias for vacuum tube stages should have a well filtered direct-current output.

It is accordingly an object of the invention to provide means for producing a negative bias voltage, substantially free from any alternating-current voltage variation.

Another object of the invention is to provide means for generating a negative bias voltage from the transformer used to supply alternating-current voltage to the plate voltage rectifier.

Another object of the invention is to provide means for producing a negative bias voltage by use of a bridge-type full-wave rectifier connected across the secondary of the transformer which supplies alternating-current voltage to the plate voltage rectifier.

Another object of the present invention is to provide a negative bias voltage by use of a full-wave bridge-type rectifier in which the cathodes of the rectifier tubes are operated at ground potential, thus eliminating the possibility of cathode-filament breakdown.

Other objects, advantages and capabilities of the invention will become apparent from the following description taken in conjunction with the accompanying drawings, showing an embodiment of the invention in which:

Fig. 1 is a schematic diagram of the preferred circuit;

Fig. 2 is another arrangement of the circuit of Fig. 1, showing the charge and discharge current paths in a bridge-type circuit arrangement.

Referring to Fig. 1, the secondary winding of transformer 1, the primary of which is connected to an alternating-current voltage source, is divided into two sections 2 and 3 by a center tap 4 to ground and supplies, from the ungrounded ends thereof, out of phase alternating-current voltages to a conventional plate voltage supply 5 and a negative bias supply 6. The negative bias supply 6 comprises a diode 7, the plate 8 of which is coupled through a condenser 9 to the ungrounded end of the secondary winding section 2 of transformer 1. The plate 10 of another diode 11 is coupled through condenser 12 to the ungrounded end of the other secondary section 3 of transformer 1. The cathodes 13 and 14 of diodes 7 and 11 respectively, are coupled to ground and to one terminal 15 of bleeder resistor 16. The cathode filaments 13' and 14' of cathodes 13 and 14, respectively, are coupled to any conventional alternating current heater supply, as, for example the common heater supply for the electronic circuits with which the instant bias supply system may be operated. Such heater supply systems are usually operated at direct current ground potential. Consequently, operation of the cathodes 13 and 14 at ground potential obviates the danger of filament-to-cathode voltage breakdown, a common occurrence in prior art bias supplies in which the cathodes are operated at a high positive or negative D.-C. potential level.

A condenser 17 is shunted across the bleeder resistor 16 to filter the ripple frequency components present at terminal 18. The plates 8 and 10 of diodes 7 and 11 are connected to the ungrounded terminal 18 of bleeder resistor 16 through a pair of identical resistors 19 and 20 forming two adjacent arms of a bridge circuit, the opposing arms being formed by condenser 9 and secondary winding 2 and by condenser 12 and secondary winding 3, respectively. The circuit shown, therefore, forms a single-phase full-wave rectifier of the bridge type. Terminal 18 is substantially at the electrical center of the secondary winding of transformer 1, since the arms of the bridge consisting of identical resistors 19 and 20 and condensers 9 and 12 are symmetrically disposed relative to terminals 4 and 18.

Referring to Fig. 2, during positive half cycles of the alternating-current voltage across sections 2 and 3 of transformer 1, an initial charge is developed across condensers 9 and 12 due to current flowing through the short time constant charging paths indicated by dotted lines and consisting of secondary section 2, condenser 9 and diode 7, and of secondary section 3, condenser 12 and diode 11, respectively. During the negative half cycles of the alternating-current voltage across sections 2 and 3 of transformer 1, the charge on condensers 9 and 12 tends to leak off to ground through the long time constant current paths shown in solid lines and consisting of resistor 16, bleeder resistor 20, condenser 9 and secondary section 2, and of resistor 16, bleeder resistor 19, condenser 12 and secondary section 3, respectively. The ripple frequence components usually existent in the output of such supply circuits are substantially canceled out at terminal 15 since the voltage components through the two current paths are of substantially equal amplitude and out of phase. Since the time constant of the discharge path is much greater than that of the charge path, the negative bias voltage developed at terminal 18 is substantially constant and the ripple frequency components existing in this voltage are removed by a filter consisting of bleeder resistor 16 shunted by condenser 17.

Various modifications may be made in the invention without departing from the spirit and scope thereof, and it is desired therefore that any such limitations shall be placed thereon as are imposed by the prior art and are set forth in the appended claims.

What is claimed is:

1. An apparatus for producing a uni-directional negative bias supply from an alternating current voltage source comprising energy storage means, a charging circuit for charging the energy storage means from the voltage source during positive half-cycles of the alternating current, said charging circuit including a uni-directional current regulating device and coupling means serially connecting the energy storage means and the regulating device across the voltage source, a discharge circuit for the energy storage means including an impedance and coupling means serially connecting the energy storage means and the impedance across the voltage source with the impedance connected in shunt with the regulating device, said impedance having a value establishing a time constant for the discharge circuit long relative to the time constant of the charging circuit, and an output circuit fed from the discharge circuit.

2. An apparatus for producing a uni-directional negative bias supply from an alternating current voltage source comprising a condenser, a charging circuit for charging the condenser from the voltage source during positive half-cycles of the alternating current, said charging circuit including rectifier means and coupling means serially connecting the condenser and the rectifier means across the voltage source, a discharge circuit for the condenser including resistance means and coupling means serially connecting the condenser and the resistance means across the voltage source with the resistance means in shunt with the rectifier means, said resistance means having a value establishing a time constant for the discharge circuit long relative to the time constant of the charging circuit, and a filtered output circuit fed from the discharge circuit.

3. An apparatus for producing a uni-directional negative bias supply comprising an alternating current voltage source, storage condenser means, a charging circuit for charging the storage condenser means from the voltage source during positive half-cycles of the alternating current, said charging circuit including a rectifier having an anode and coupling means connecting the storage condenser means across the voltage source through said rectifier with its anode connected to the storage condenser means, a discharge circuit for the storage condenser means including an impedance connected across the voltage source in series with the storage condenser means and in parallel with the rectifier, and an output circuit coupled to the discharge circuit.

4. An apparatus for producing a uni-directional negative bias supply comprising an alternating current voltage source, a condenser, a charging circuit for charging the condenser from said source during positive half-cycles of the alternating current, said charging circuit including rectifier means and coupling means connecting one terminal of said condenser to one terminal of the voltage source and connecting the other terminal of the condenser to the other terminal of the voltage source through the rectifier means, a discharge circuit for said condenser including resistance means and coupling means connecting said other terminal of said condenser to the other terminal of said source through the resistance means so that the condenser is discharged through the resistance means during negative half-cycles of the alternating current, and means supplying a uni-directional potential responsively to current flow through the resistance means.

5. An apparatus for producing a uni-directional negative bias supply comprising an alternating current voltage source, transformer means fed by the voltage source providing a pair of alternating current outputs, a pair of energy storage means, a charging circuit for charging the pair of energy storage means from the pair of alternating current outputs during positive half-cycles thereof, said charging circuit including uni-directional current regulating means and coupling means connecting the pair of energy storage means to the pair of alternating current outputs of the transformer means through the uni-directional current regulating means, a discharge circuit for the pair of energy storage means including impedance means connected to the pair of energy storage means in shunt with the regulating means, the impedance means having a value establishing a time constant for the discharge circuit long with respect to the time constant of the charging circuit, and an output circuit fed from the discharge circuit.

6. An apparatus for producing a uni-directional negative bias supply comprising an alternating current voltage source, a transformer having a primary coupled to the voltage source and a secondary providing a pair of alternating current output terminals, a pair of condensers, a charging circuit for charging the condensers from the alternating current output terminals during positive half-cycles of the alternating current, said charging circuit including rectifier means and coupling means connecting one terminal of the condensers to separate alternating current output terminals and connecting the other terminal of the condensers to the mid-point of the transformer secondary through the rectifier means, a discharge circuit for the condensers including resistance means connected to the other terminal of the condensers and to the mid-point of the secondary and an output circuit fed from the resistance means.

7. An apparatus for producing a uni-directional negative bias supply comprising an alternating current voltage source, a transformer having a primary coupled to the voltage source and a centrally-grounded secondary providing a pair of alternating current output terminals, a pair of condensers, a charging circuit for charging the condensers from the alternating current output terminals during positive half-cycles of the alternating current, said charging circuit including coupling means connecting one terminal of the condensers to separate alternating current output terminals and connecting the other terminal of the condensers to ground through a rectifier, a discharge circuit for the condensers including resistance means coupled between the other terminals of the condensers and a resistance connected between the mid-point of said resistance means and ground, and an output circuit connected to the mid-point of said resistance means.

JOHN A. RÁDO.

REFERENCES CITED

The following references are of record in the file of this patent:

UNITED STATES PATENTS

| Number | Name | Date |
| --- | --- | --- |
| 2,271,181 | Brunn | Jan. 27, 1942 |
| 2,343,285 | Dodington | Mar. 7, 1944 |